THOMAS E. HATTERSCHIDE
INVENTOR

BY John R. Faulkner
Glenn S. Arendsen

ATTORNEYS

United States Patent Office 3,486,942
Patented Dec. 30, 1969

3,486,942
PROCESS FOR MANUFACTURING
BATTERY PLATES
Thomas E. Hatterschide, Owosso, Mich., assignor to Ford Motor Company, Dearborn, Mich., a corporation of Delaware
Filed May 16, 1968, Ser. No. 729,676
Int. Cl. H01m 39/00, 35/26
U.S. Cl. 136—67               14 Claims

ABSTRACT OF THE DISCLOSURE

Cast lead alloy grids for use as the plates in lead-acid batteries are sanded by a sanding belt moving about 3800 feet per minute to a substantially uniform thickness before passing between the die plates of a pasting machine. A carrier belt transports the grids beneath an arcuate portion of the sander belt, and both belts have abrasive surfaces of electrostatically applied silicon carbide grit. Sets of positioning pads located on the die plates accurately position the die plates relative to each other and insure careful control over the amount of paste applied to the sanded grids as the grids pass between pasting rollers.

SUMMARY OF THE INVENTION

Battery plates for lead-acid batteries are manufactured by first casting a grid of a lead alloy and then filling the grid with a paste of an active plate material. The paste is cured on the grid which then is subjected to an electric current that converts the pasted grids into plates of positive and negative polarities.

The compactness and efficiency of the resulting battery depends in a large measure on the dimensional accuracy of the plates, which in turn depends on the dimensional accuracy of the grids entering the pasting operation and on the accuracy of the pasting operation itself. In the past, a simple pressing operation has utilized the ductility of the lead alloy grids to flatten any high spots formed in the grid casting operation. After the pressing operation, the grids were passed between a set of pasting rolls that applied the paste. Dimensional control of the resulting filled plates was relatively poor for two primary reasons: First, even though the lead alloy in the grid was relatively soft and ductile, it was impossible for the pressing operation to produce grids of any reasonably uniform thickness; and second, the die plates in the pasting operation were positioned relative to each other by a complicated mechanical system exterior to the pasting mechanism and thermal expansion acting on the considerable length of the mechanical system changed the distance between the die plates whenever the temperature changed.

Filled plates made according to the process of this invention have greatly improved dimensional accuracy and thereby permit the manufacture of lead-acid batteries having higher power per unit weight and higher power per unit size. In addition, the batteries are less susceptible to intracell shorting and physical shock and are easier to manufacture. In the process of this invention, the battery grid is sanded on at least one side prior to the pasting operation. After sanding, the grid is aligned with the die plates in the pasting mechanism. Each die plate has several small positioning pads in corresponding locations where the pads of the upper plate rest on the lower plate to establish the amount of clearance between the die plates. The pads are removable so the clearance, and consequently the thickness of the paste, can be varied readily. Paste filled grids leaving the die plates are suspended in a vertical position and passed through a curing oven.

Sanding can be carried out in either a dry or wet operation. Wet sanding increases sanding belt life and reduces the amount of dust formed in sanding, but it is imperative that absolutely dry grids enter the pasting operation so a drying section becomes essential when wet sanding. Dry sanding thus requires less initial investment and less plant space.

A high speed belt sander is used to perform the sanding operation. Both the sanding belt and the conveying belt preferably use an electrostatically deposited silicon carbide grit in grit sizes ranging from 80–160. Small rubber surfaced cylindrical rolls heavily loaded by springs and extending entirely across the grids are positioned immediately before and after the sanding belt to hold the grids in contact with the conveying belt as sanding takes place.

DETAILED DESCRIPTION

Figure 1:
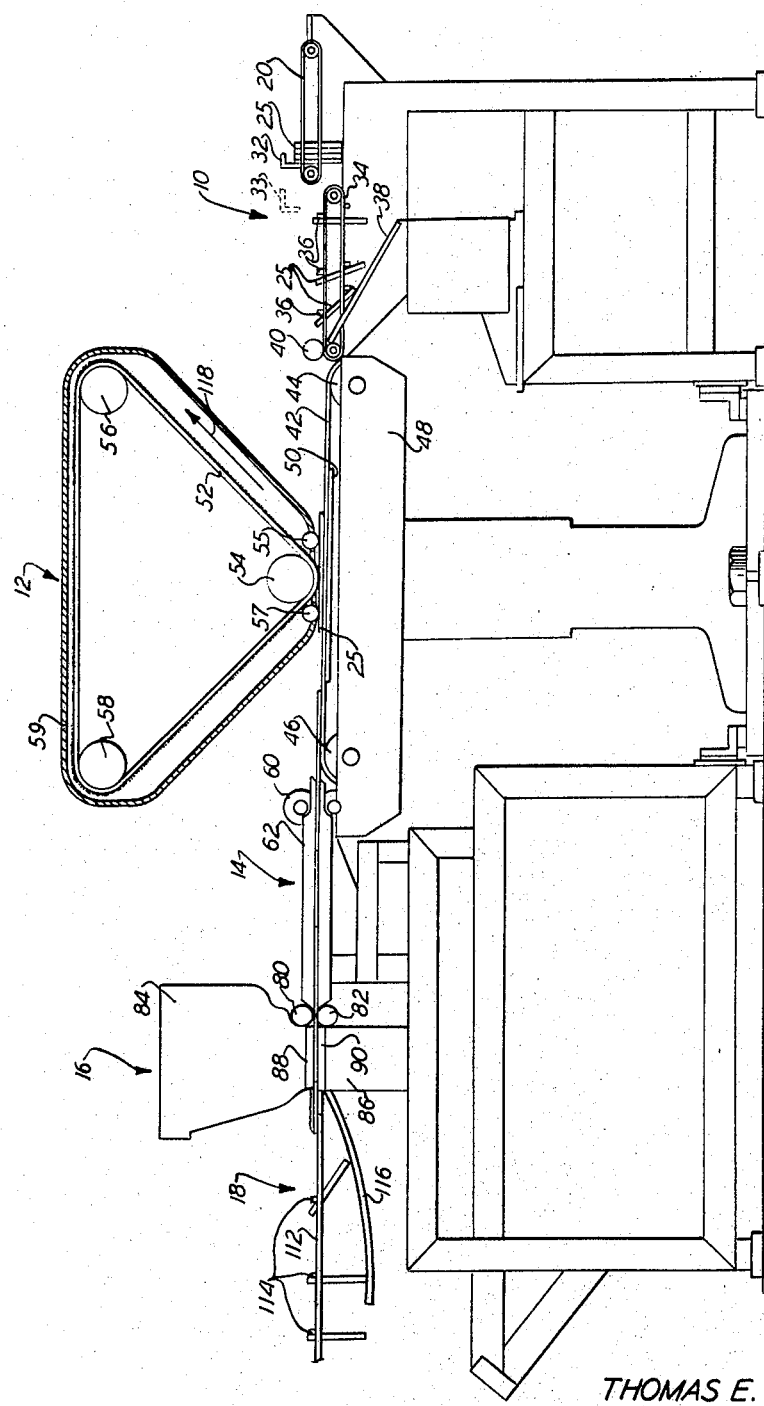
FIGURE 1 is an elevation view of machinery capable of performing the sizing and pasting operations of this invention. The plates move from right to left in FIGURE 1 with the as-cast grids stacked horizontally at the right and filled grids moving out of the machine at the left.

Five basic pieces of equipment are used to carry out the process of this invention. Referring to FIGURE 1, these pieces of equipment are a feeder mechanism designated generally by numeral 10, a sanding mechanism 12, an aligning mechanism 14, a pasting mechanism 16, and an unloading mechanism 18.

Figure 2:
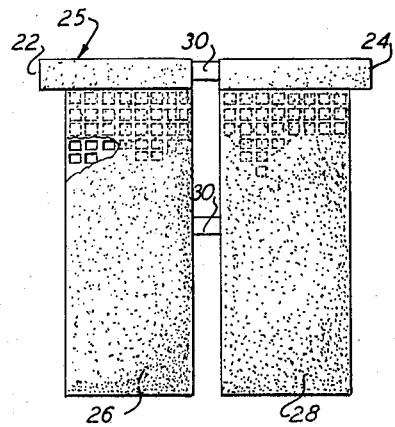
FIGURE 2 is an end view of a typical grid used in the process. After filling and curing, each grid is cut in half to make two complete battery plates.

The first section of the feeder mechanism comprises two slowly moving chains positioned laterally to each other and designated by numeral 20 in FIGURE 1 (since FIGURE 1 is a side view, only one of the chains is shown). The tops of the chains are flat and the chains are spaced laterally by the distance between tabs 22 and 24 on each side of the grid 25 shown in FIGURE 2. Each grid actually is two plate skeletons 26 and 28 connected to each other by spreaders 30. The grids usually are a lead base alloy comprising more than 94 weight percent lead and are relatively flexible. Skeletons 26 and 28 have a lattice structure with a relatively high proportion of open area. After the grids have been filled with paste and the paste has been cured, spreaders 30 are broken out to separate the two plates.

In the feeder mechanism, tabs 22 and 24 rest on chains 20 and are moved slowly to the left by the movement of the chains 20. Since these chains have flat tops, a supply of grids can be horizontally stacked thereon and the friction between the tabs and the smooh chain tops urges the grids toward the left end of the chains.

At the left end of chains 20, two reciprocating lugs 32 having small vacuum cups thereon (not shown) are located in line with tabs 22 and 24. The lugs are reciprocable from a position just above the left rollers for chains 20 to a leftward position indicated by the phantom lug 23, which is above a second set of chains designated by numeral 34. Chains 34 move considerably faster than chains 20 and carry a plurality of spaced dogs 36. Below chains 34 is a cam member 38 having its cam surface sloping upward toward the left end of chains 34. The cam surface approaches the level of the upper chains 34 at its left end. A set of small driven rolls 40 is located between chains 34 and above the left end thereof.

Chains 34 terminate adjacent the beginning of the carrier belt 42 of sanding mechanism 12. Belt 42 runs in a substantially horizontal plane between two rolls 44 and 46 at each end of a lower table 48, and is supported on a rigid plate 50 for the central portion of its length. Rolls 44 and 46 have relatively small diameters, preferably less than about 6 inches, and belt 42 wraps 180° around each roll. Positioned above plate 50 is a sander belt 52 mounted in a triangular configuration on rolls 54, 56 and 58, with the lower roll 54 space a short distance above carrier belt 42. Rolls 54, 56 and 58 have diameters preferably less than about 4 inches and belt 52 wraps 120° around each roll. The sander belt and its rolls are mounted in an enclosing housing 60. Both the sander belt and the carrier belt have an electrostatically deposited silicon carbide grit in grit size from number 160 to 80. Such belts can be obtained from the Carborundum Corporation or the Armour Abrasives Co.

On each side of roll 54 is a rubber surfaced cylindrical guide roll 55, 57. Guide rolls 55 and 57 extend laterally across the carrier belt for a distance exceeding the grid width and are spring loaded onto the carrier belt with a force of at least 50–100 pounds.

Figure 4:
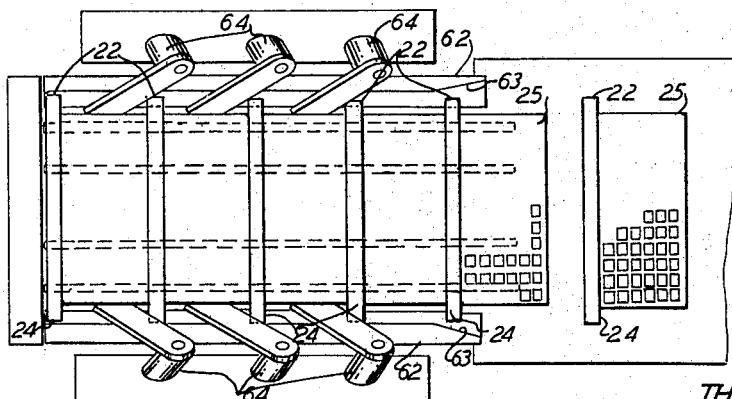
FIGURE 4 is a top view of the aligning mechanism.

A set of spring loaded feed rolls 60 for the aligning mechanism is located at the right end of carrier belt 52. Referring to FIGURES 1 and 4, a pair of guide rails 62 extend along each side of the aligning mechanism. The right ends of rails 62 taper inward as represented by numeral 63. Three fingers 64 project angularly along each side of the guide rails and terminate inside the rails (fingers 64 are shown only in FIGURE 4). Fingers 64 are loosely mounted so the inner ends can pivot upwardly but normally exert a downward force. The fingers extend in a downstream direction and the inner ends are cut at compound angles substantially parallel to the surface of carrier belt 52.

Figure 3:
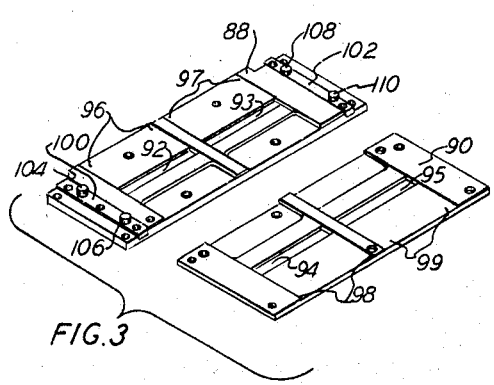
FIGURE 3 is a view of the pasting dies showing the elongated orifices in the dies and the positioning pads.

At the left end of the aligning mechanism a pair of feeder rolls 80 and 82 drive the grids into the pasting mechanism 16. Pasting mechanism 16 comprises a large hopper 84 mounted on a base 86 via two die plates 88 and 90. Referring to FIGURE 3, each of die plates 88 and 90 contains two orifices 92, 93, 94, 95 disposed laterally across the direction of grid movement. The lateral length of the orifices equals the width of the grid. A groove is formed along each edge of the upper die plate 88 and a removable block 100, 102 is fastened in each groove. Each block has two small positioning pads 104, 106, 108, 110 mounted on its open surface so the pads project about 0.040–0.080 inch above the surface of the die plate. The surface of the die plates upstream and downstream of the orifices are machined slightly to produce shallow depressions indicated by 96, 97, 98, 99. These depressions usually are no greater than 0.004 inch deep.

Die plate 88 is fastened to hopper 84 and die plate 90 is fastened to base 86. The hopper is then positioned on the base so upper plate 88 lies above plate 90, with the positioning pads resting on the lower plate and thereby spacing the plates by the amount of pad projection.

Figure 5:
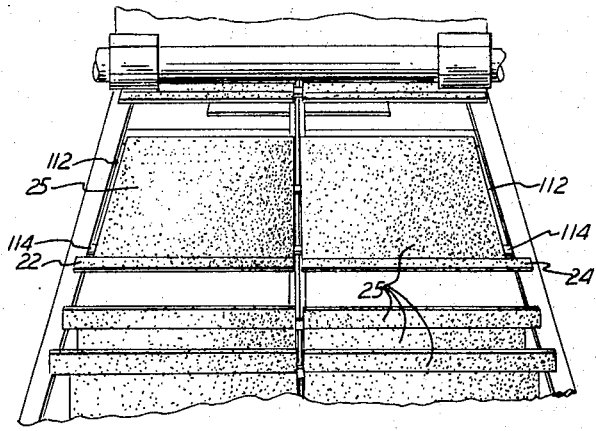
FIGURE 5 is an end view taken from the left end of FIGURE 1 showing pasted plates exiting from the machinery.

Unloading mechanism 18 lies just to the left of pasting mechanism 16 and comprises two laterally spaced traveling chains 112 (see FIGURE 5). Chains 112 have dogs 114 spaced along the outer sides. A declining cam member 116 is located below chains 112.

OPERATION

Grids in the as-cast condition are stacked manually on chains 20 which move the grids toward the left until the foremost grid contacts lugs 32. Chains 20 have smooth tops and move slowly so no excess friction is generated between the chains and the grids. Lugs 32 are coordinated with movement of chains 34 and at the appropriate time the vacuum cups on the lugs clamp onto a grid. The lugs then move leftward to the position shown for lug 33, at which point the vacuum is released and the grid drops onto chains 34. Dogs 36 contact tabs 22 and 24 of the grids and move the grids at a faster rate sufficient to provide spacing between the grids. As each grid moves leftward on chains 34, the bottom of the grid rides up cam member 38 so the grid is in a substantially horizontal position when it reaches the end of chains 34.

Chains 34 carry the grids into contact with rolls 40 which deliver the grids onto carrier belt 42 of the sanding mechanism. Belt 42 moves at a speed of approximately 60–75 feet per minute and carries the grids toward sander belt 52. As the grids reach roll 55, that roll is deflected upward against the force of its loading spring (not shown) and the force exerted thereby produces sufficient friction between the grid and the carrier belt to pass the grid under the sander belt. Roll 57 serves an identical function on the portion of the grid leaving the sander belt.

Sander belt 52 moves at about 3800 feet per minute in the direction of arrow 118, and as the grids move beneath roller 54, sander belt 52 substantially removes variations in grid thickness. Grids exiting from the sander belt generally have a thickness variation of only about 0.0015–0.002 inch. After sanding, carrier belt 42 delivers the grids to the aligning mechanism 14. Both the sander belt and the carrier belt bend sharply around the respective supporting rolls with the sanding surfaces facing outward; this arrangement opens slightly the grit on the belts which assists in removing the lead alloy particles from the grit. The small roll diameters and high belt speeds are especially useful in this regard. Since the amount of belt wrap on rolls 54, 56 and 58 is less than that on rolls 44 and 46, rolls 54, 56 and 58 preferably have smaller diameters.

Rolls 60 urge the grids between guide rails 62 and taper 63 centers the grids between the rails. As the grids move between the rails, fingers 64 pass over the tabs 22 and bear against the edges of the skeleton portions of the grids to hold the grids squarely between the guide rails. Each succeeding grid contacts its preceding grid and rolls 60 drive the grids through the aligning mechanism.

Aligned grids from mechanism 14 are fed between die plates 88 and 90 by feeder rolls 80 and 82. The skeleton portions 26 and 28 of each grid pass over the depressions 96–99 in the die plates while the tabs 22, 24 slide on the die plate surfaces. As the skeleton portions pass over orifices 92–95, appropriate paste feeding mechanisms located within hopper 84 and base 86 force the paste through the orifices and into the skeletons. The thickness of the paste applied to the grid is determined by the projecting distance of positioning pads 104–110. Since the thickness tolerances on the grids are so low, the grids are held accurately between the die plates and paste is applied uniformly.

The paste filled grids exit from the die plates in a horizontal position with the tabs just above chains 112. Dogs 114 on the chains contact the tabs and, as the grids move to the left, the bottom edges of the grids slide down cam member 116 until the grids reach a vertical position.

Generally, sanding is necessary on only one side of the grids to maintain adequate control over the paste thickness and distribution. A small amount of sanding on both sides can be achieved by reducing the loads on rolls 55 and 57 to the point where some slipping takes place between the grids and the carrier belt. Best results are obtained when operating the sander belt at the high speed disclosed above, but good results can be obtained with slower speeds. It is preferable, however, to have the sander belt speed considerably higher than the carrier belt speed. For a wet sanding operation, appropriate wetting means are associated with the sander belt and an air drying mechanism is installed above aligning mechanism 14. If a change in paste thickness is desired, blocks 100 and 102 can be readily replaced with blocks having higher or lower positioning pads.

Thus the process of this invention produces highly accurate grids and carefully controls the thickness of the paste applied thereto. Variations in paste thickness are easily effected to adapt the equipment to varying battery requirements, which greatly increases equipment versatility. The combination of high belt speeds and high belt wrap around at least one supporting roll prolongs belt effectiveness by assisting in removing the lead alloy particles from the belts.

What is claimed is:

1. In a process for making plates for a lead-acid battery in which lead base grids are filled with a paste of active plate material, the improvement comprising sanding at least one side of said grids to produce a substantially uniform thickness and filling said grids with paste, said sanding comprises locating said grid in a horizontal position on a carrier belt, loading the grid onto the belt, and passing the grid under a sanding belt while maintaining the load on a grid.

2. The process of claim 1 in which both the carrier belt and the sander belt have an abrasive surface.

3. The process of claim 2 in which the sander belt has an electrostatically deposited silicon carbide grit and the sander belt operates at a speed exceeding the speed of the carrier belt.

4. The process of claim 3 in which the sander belt speed is about 3800 feet per minute and the carrier belt speed is about 70 feet per minute.

5. The process of claim 4 in which the filling operation comprises passing the grid between two die plates, forcing paste onto said grid through elongated orifices extending laterally to the direction of movement of said grid, and spacing said die plates from each other by positioning pads fastened to said die plates, the spacing of said plates determining the thickness of paste applied to said grid.

6. The process of claim 5 in which the carrier belt delivers the grids to a mechanism aligning the grids squarely with said die plates.

7. The process of claim 6 comprising loading the grids onto the carrier belt as the grids approach and leave the sander belt by spring loaded cylindrical rolls positioned just upstream and downstream of the position where the sander belt sands the grids.

8. The process of claim 7 in which the carrier belt and sander belt wrap at least about 120° around at least one of the respective supporting rolls, said supporting roll having diameters less than about 6 inches.

9. The process of claim 1 in which both the carrier belt and the sander belt have an electrostatically deposited silicon carbide grit, said belts wrapping at least about 120° around at least one of the respective supporting rolls, said roll having a diameter less than about 6 inches.

10. A process for making plates for a lead-acid battery comprising casting grids for said plates from a lead base metal, said grids having small tabs projecting from opposite sides and having a large proportion of open area, supporting said grids by said tabs from a set of slowly moving spaced chains, placing said grids in a horizontal position on a carrier belt having an abrasive surface, moving said carrier belt to bring one face of each of said grids into a position proximate to a sander belt moving at a high speed in a direction opposite to the direction of the carrier belt, contacting portions of the grid faces with said sander belt to remove excess grid material therefrom and produce a substantially uniform grid thickness, aligning said grids with a pasting machine, and filling said grids with paste.

11. The process of claim 9 comprising aligning the sanded grids with the space between upper and lower die plates, determining the spacing between said die plates by positioning pads fastened to one die plate and bearing on the other die plate, passing the grids through the space between said die plates and forcing paste into said grids through orifices located in the die plates as the grids pass between the die plates.

12. The process of claim 11 comprising moving the sander belt at a high speed around a roll with the grit side of the sander belt on the outer side to open the grit and remove plate material from the grit.

13. The process of claim 12 in which both the sander belt and the carrier belt have an electrostatically deposited silicon carbide grit.

14. The process of claim 13 in which the carrier belt and the sander belt wrap at least 120° around at least one of the respective supporting rolls, said supporting roll having a diameter less than about 6 inches.

References Cited

UNITED STATES PATENTS

| | | | |
|---|---|---|---|
| 1,284,425 | 11/1918 | Morrison | 136—36 |
| 3,269,863 | 8/1966 | Helms | 136—36 |

WINSTON A. DOUGLAS, Primary Examiner

C. F. LEFEVOUR, Assistant Examiner

U.S. Cl. X.R.

136—27